United States Patent
Qu et al.

(10) Patent No.: US 12,301,833 B2
(45) Date of Patent: *May 13, 2025

(54) METHOD FOR VIDEO-BASED PATCH-WISE VECTOR QUANTIZED AUTO-ENCODER CODEBOOK LEARNING FOR VIDEO ANOMALY DETECTION

(71) Applicant: Samsung Display Co., Ltd., Yongin-si (KR)

(72) Inventors: Shuhui Qu, Fremont, CA (US); Qisen Cheng, Cupertino, CA (US); Yannick Bliesener, San Jose, CA (US); Janghwan Lee, Pleasanton, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 95 days.

This patent is subject to a terminal disclaimer.

(21) Appl. No.: 18/074,195

(22) Filed: Dec. 2, 2022

(65) Prior Publication Data

US 2024/0048724 A1    Feb. 8, 2024

Related U.S. Application Data

(60) Provisional application No. 63/395,782, filed on Aug. 5, 2022.

(51) Int. Cl.
*H04N 19/157* (2014.01)
*G06V 10/44* (2022.01)
(Continued)

(52) U.S. Cl.
CPC .......... *H04N 19/157* (2014.11); *G06V 10/44* (2022.01); *G06V 10/761* (2022.01); *G06V 20/49* (2022.01); *H04N 19/94* (2014.11)

(58) Field of Classification Search
CPC ...... G06V 10/44; G06V 10/761; G06V 10/82; G06V 20/49; G06V 20/52; H04N 19/157; H04N 19/94
(Continued)

(56) References Cited

U.S. PATENT DOCUMENTS 7,020,330 B2   3/2006   Schröder et al.
7,035,431 B2   4/2006   Blake et al.
(Continued)

OTHER PUBLICATIONS

Wang et al., Image Anomaly Detection Using Normal Data Only by Latent Space Resampling, 2020, Applied Sciences, pp. 1-19. (Year: 2020).*

(Continued)

*Primary Examiner* — Kathleen M Walsh
(74) *Attorney, Agent, or Firm* — Lewis Roca Rothgerber Christie LLP (57) ABSTRACT

According to some embodiments, a system includes: a memory, an encoder; a decoder, wherein the system is operable to: receive, at the encoder, an input video; divide, by the encoder, the input video into a plurality of video patches; select, by the encoder, codes corresponding to the plurality of video patches of the input video, from a codebook comprising the codes; determine, by the encoder, an assigned code matrix comprising the codes corresponding to the plurality of video patches of the input video; receive, by the decoder, the assigned code matrix from the encoder; and generate, by the decoder, a reconstructed video based on the assigned code matrix.

20 Claims, 6 Drawing Sheets

(51) Int. Cl.
G06V 10/74 (2022.01)
G06V 20/40 (2022.01)
H04N 19/94 (2014.01)

(58) Field of Classification Search
USPC .................................................. 375/240.22
See application file for complete search history.

(56) References Cited

U.S. PATENT DOCUMENTS

| | | | |
|---|---|---|---|
| 8,165,410 | B2 | 4/2012 | Perronnin |
| 9,002,109 | B2 | 4/2015 | Krishnaswamy et al. |
| 9,129,190 | B1 | 9/2015 | Ranzato |
| 9,424,492 | B2 | 8/2016 | Murray et al. |
| 10,430,689 | B2 | 10/2019 | Lin et al. |
| 10,572,725 | B1 | 2/2020 | Becker et al. |
| 10,965,948 | B1 | 3/2021 | Appalaraju et al. |
| 11,080,833 | B2 | 8/2021 | Barnes et al. |
| 2002/0122596 | A1 | 9/2002 | Bradshaw |
| 2012/0099796 | A1 | 4/2012 | Zitnick, III |
| 2012/0155550 | A1 | 6/2012 | Wu et al. |
| 2014/0223913 | A1 | 8/2014 | Fanella et al. |
| 2016/0098619 | A1 | 4/2016 | Gaidon et al. |
| 2017/0103264 | A1* | 4/2017 | Javan Roshtkhari .. G06V 20/49 |
| 2019/0095787 | A1* | 3/2019 | Kung ........................ G06F 18/00 |
| 2019/0171908 | A1 | 6/2019 | Salavon |
| 2020/0120217 | A1 | 4/2020 | Xu et al. |
| 2020/0250528 | A1 | 8/2020 | Van den Oord et al. |
| 2020/0304802 | A1* | 9/2020 | Habibian ................ G06N 3/045 |
| 2023/0267600 | A1* | 8/2023 | Qu ........................... G06T 7/001 382/141 |
| 2023/0316454 | A1* | 10/2023 | Olszewski ............. G06N 3/094 382/100 |
| 2023/0351558 | A1* | 11/2023 | Chen ........................ G06T 5/60 |
| 2024/0078414 | A1* | 3/2024 | Koyuncu .............. G06N 3/0464 |
| 2024/0112088 | A1* | 4/2024 | Yu ........................ G06N 3/0455 |

OTHER PUBLICATIONS

T. Czimmermann, G. Ciuti, M. Milazzo, M. Chiurazzi, S. Roccella, C. M. Oddo, P. Dario, "Visual-Based Defect Detection and Classification Approaches for Industrial Applications—A Survey", Sensors 20 (5) (2020) 1459 (25 pages).

J. Yang, S. Li, Z. Wang, H. Dong, J. Wang, S. Tang, "Using Deep Learning to Detect Defects in Manufacturing: A Comprehensive Survey and Current Challenges", Materials 2020, 13, 5755 (23 pages).

J. Lee, S. Qu, Y. Kang, W. Jang, "Multimodal Machine Learning for Display Panel Defect Layer Identification", 2021 32nd Annual SEMI Advanced Semiconductor Manufacturing Conference (ASMC), IEEE, 2021, pp. 1-7.

T. Nakazawa, D. V. Kulkarni, "Anomaly Detection and Segmentation for Wafer Defect Patterns Using Deep Convolutional Encoder-Decoder Neural Network Architectures in Semiconductor Manufacturing", IEEE Transactions on Semiconductor Manufacturing, 32 (2019) 250-256.

J. Lee, 16-4: "Invited Paper: Region-Based Machine Learning for OLED Mura Defects Detection", SID Symposium Digest of Technical Papers, vol. 52, Wiley Online Library, 2021, pp. 200-203.

Y. Li, W. Zhao, J. Pan, "Deformable Patterned Fabric Defect Detection With Fisher Criterion-Based Deep Learning", IEEE Transactions on Automation Science and Engineering, vol. 14, No. 2, Apr. 2017, pp. 1256-1264.

S. Mei, Y. Wang, G. Wen, Automatic Fabric Defect Detection with A Multi-Scale Convolutional Denoising Autoencoder Network Model:, Sensors, 2018, 1064 (18 pages).

S. Vaikundam, T.-Y. Hung, L. T. Chia, "Anomaly Region Detection And Localization In Metal Surface Inspection", 2016 IEEE International Conference on Image Processing (ICIP), IEEE, 2016, pp. 759-763.

R. Ren, T. Hung, K. C. Tan, A Generic Deep-Learning-Based Approach for Automated Surface Inspection, IEEE Ttransactions on Cybernetics, vol. 48, No. 3, Mar. 2018, pp. 929-940.

J. Lee, W. Xiong, W. Jang, "Trace Data Analytics with Knowledge Distillation: DM: Big Data Management and Mining", 2020 31st Annual SEMI Advanced Semiconductor Manufacturing Conference (ASMC), IEEE, 2020, pp. 1-8.

J. Deng, W. Dong, R. Socher, LJ Li, K. Li, L. Fei-Fei, "Imagenet: A Large-Scale Hierarchical Image Database", 2009 IEEE conference on computer vision and pattern recognition, IEEE, 2009, pp. 248-255.

P. Bergmann, M. Fauser, D. Sattlegger, C. Steger, "Uninformed Students: Student-Teacher Anomaly Detection with Discriminative Latent Embeddings", arXiv:1911.02357v2 [cs.CV], Mar. 18, 2020 (11 pages).

N. Cohen, Y. Hoshen, "Sub-Image Anomaly Detection with Deep Pyramid Correspondences", arXiv:2005.02357v3 [cs.CV], Feb. 3, 2021 (17 pages).

T. Defard, A. Setkov, A. Loesch, R. Audigier, "PaDiM: A Patch Distribution Modeling Framework for Anomaly Detection and Localization", arXiv:2011.08785v1 [cs.CV] Nov. 17, 2020 (7 pages).

K.Roth, et al., "Towards Total Recall in Industrial Anomaly Detection", arXiv preprint arXiv:2106.08265 , 2021 (18 pages).

A. Ramesh, M. Pavlov, G. Goh, S. Gray, C. Voss, A. Radford, M. Chen, I. Sutskever, "Zero-Shot Text-to-Image Generation", arXiv preprint arXiv:2102.12092 (2021).

P. Esser, R. Rombach, B. Ommer, "Taming Transformers for High Resolution Image Synthesis"; Proceedings of the IEEE/CVF Conference on Computer Vision and Pattern Recognition, 2021, pp. 12873-12883.

A. Razavi, A. van den Oord, O. Vinyals; "Generating Diverse High-Fidelity Images with VQVAE-2"; Advances in neural information processing systems, 2019, pp. 14866-14876.

A. van den Oord, O. Vinyals, K. Kavukcuoglu; "Neural Discrete Representation Learning", Proceedings of the 31st International Conference on Neural Information Processing Systems, 2017, pp. 6309-6318.

A. Dosovitskiy, L. Beyer, A. Kolesnikov, D. Weissenborn, X. Zhai, T. Unterthiner, M. Dehghani, M. Minderer, G. Heigold, S. Gelly, et al., An Image Is Worth 16x16 Words: Transformers For Image Recognition At Scale, International Conference on Learning Representations, 2020 (22 pages).

S. Khan, M. Naseer, M. Hayat, S. W. Zamir, F. S. Khan, M. Shah, "Transformers in Vision: A Survey", arXiv preprint arXiv:2101.01169 (2021).

P. Mishra, R. Verk, D. Fornasier, C. Piciarelli, G. L. Foresti, VT-ADL: A Vision Transformer Network for Image Anomaly Detection and Localization, arXiv preprint arXiv:2104.10036 (2021) (6 pages).

P. Bergmann, M. Fauser, D. Sattlegger, C. Steger, "MVTec Ad—A Comprehensive Real-World Dataset for Unsupervised Anomaly Detection" Proceedings of the IEEE/CVF Conference on Computer Vision and Pattern Recognition, 2019, pp. 9592-9600.

Y. Huang, C. Qiu, Y. Guo, X. Wang, K. Yuan, "Surface Defect Saliency of Magnetic Tile", 2018 IEEE 14th International Conference on Automation Science and Engineering (CASE), Munich, Germany, Aug. 20-24, 2018, 612-617.

J. Masci, U. Meier, D. Ciresan, J. Schmidhuber, G. Fricout, A. Mittal, "Steel Defect Classification with Max-Pooling Convolutional Neural Networks", WCCI 2012 international Joint Conference on Neural Networks (IJCNN), IEEE, 2012, (6 pages).

S. Cheon, H. Lee, C. O. Kim, S. H. Lee, "Convolutional Neural Network for Wafer Surface Defect Classification and the Detection of Unknown Defect Class", IEEE Transactions on Semiconductor Manufacturing 32 (2) (2019) 163-170.

Y. He, K. Song, Q. Meng, Y. Yan, "An End-to-End Steel Surface Defect Detection Approach via Fusing Multiple Hierarchical Features", IEEE Transactions on Instrumentation and Measurement 69 (4) (2019) 1493-1504.

M. K. Ferguson, A. Ronay, YTT Lee, K. H. Law, "Detection and Segmentation of Manufacturing Defects with Convolutional Neural Networks and Transfer Learning", Smart and sustainable manufacturing systems 2 (2018).

(56) References Cited

OTHER PUBLICATIONS

H. Han, WY Wang, BH Mao, "Borderline-SMOTE: A New Over-Sampling Method in Imbalanced Data Sets Learning" International Conference on Intelligent Computing, Springer, 2005, pp. 878-887.
H. He, E. A. Garcia, "Learning from Imbalanced Data", IEEE Transactions On Knowledge and Data Engineering, vol. 21, No. 9, Sep. 2009, pp. 1263-1284.
Y. Koizumi, S. Murata, N. Harada, S. Saito, H. Uematsu, "SNIPER: Few Shot Learning for Anomaly Detection To Minimize False-Negative Rate with Ensured True-Positive Rate", ICASSP 2019-2019 IEEE International Conference on Acoustics, Speech and Signal Processing (ICASSP). IEEE, 2019, pp. 915-919.
Lv, Qianwen, and Yonghong Song, "Few-shot Learning Combine Attention Mechanism-Based Defect Detection in Bar Surface." ISIJ International, vol. 59, No. 6 (2019): 1089-1097.
L. Ruff, R. Vandermeulen, N. Goernitz, L. Deecke, S.A. Siddiqui, A. Binder, E. Müller, and M. Kloft., "Deep One-Class Classification", International Conference on Machine Learning, PMLR, 2018, (10 pages).
J. Yi, S. Yoon, "Patch SVDD: Patch-level SVDD for Anomaly Detection and Segmentation", arXiv:2006.16067v2, 2020 (22 pages).
P. Perera, V. M. Patel, "Learning Deep Features for One-Class Classification". IEEE Transactions on Image Processing, 28 (11) (2019) 5450-5463.
P. Oza, V. M. Patel, "One-Class Convolutional Neural Network", IEEE Signal Processing Letters, 26 (2) (2018) 277-281.
I. Golan, R. El-Yaniv, "Deep Anomaly Detection Using Geometric Transformations", arXiv preprint arXiv:1805.10917, 2018 (17 pages).
M. Sakurada, T. Yairi, "Anomaly Detection Using Autoencoders with Nonlinear Dimensionality Reduction"; Proceedings of the MLSDA, 2014 2nd workshop on Machine Learning for Sensory Data Analysis, 2014, pp. 4-11.
G. Kang, S. Gao, L. Yu, D. Zhang, "Deep Architecture for High-Speed Railway Insulator Surface Defect Detection: Denoising Autoencoder with Multitask Learning", IEEE Transactions on Instrumentation and Measurement vol. 68, No. 8, 2019, pp. 2679-2690.
R. Chalapathy, A. K. Menon, S. Chawla, "Anomaly Detection Using One-Class Neural Networks", arXiv preprint arXiv:1802.06360, 2019, (13 pages).
M. Sabokrou, M. Khalooei, M. Fathy, E. Adeli, "Adversarially Learned One-Class Classifier for Novelty Detection", Proceedings of the IEEE Conference on Computer Vision and Pattern Recognition, 2018, pp. (10 pages).
S. Akcay, A. Atapour-Abarghouei, T. P. Breckon, "GANomaly: Semi-Supervised anomaly Detection via Adversarial Training", arXiv preprint arXiv:1805.06725 , 2018, (16 pages).
S. Venkataramanan, KC Peng, R. V. Singh, A. Mahalanobis, "Attention Guided Anomaly Localization in Images", European Conference on Computer Vision, Springer, 2020, (19 pages).
B. Zong, Q. Song, M. R. Min, W. Cheng, C. Lumezanu, D. Cho, H. Chen,"Deep Autoencoding Gaussian Mixture Model for Unsupervised Anomaly Detection", : International Conference on Learning Representations, 2018 (19 pages).
M. Rudolph, B. Wandt, B. Rosenhahn, Same Same But DifferNet: Semi-Supervised Defect Detection with Normalizing Flows, arXiv:2008.12577v1 [cs.CV] Aug. 28, 2020 (10 pages).
D. Gudovskiy, S. Ishizaka, K. Kozuka, "CFLOW-AD: Real-time unsupervised Anomaly Detection with Localization via Conditional Normalizing Flows" arXiv preprint arXiv:2107.12571, 2021 (11 pages).
H. M. Schluter, J. Tan, B. Hou, B. Kainz, Self-Supervised Out-of-Distribution Detection and Localization with Natural Synthetic Anomalies (NSA), arXiv preprint arXiv:2109.15222, 2021 (12 pages).
C.-L. Li, K. Sohn, J. Yoon, T. Pfister, "CutPaste: Self-Supervised Learning for Anomaly Detection and Localization", arXiv:2104.04015v1 [cs.CV], Apr. 8, 2021 (28 pages).
U.S. Appl. No. 17/728,882, filed Apr. 25, 2022.
Cheng, et al. "Video Anomaly Detection and Localization Using Hierarchical Feature Representation and Gaussian Process Regression," 2015 IEEE Conference on Computer Vision and Pattern Recognition, Jun. 7, 2015, pp. 2909-2917.
European Search Report for EP Application No. 23185110.6 dated Nov. 28, 2023, 11 pages.
Fang, et al. "Muti-Encoder Towards Effective Anomaly Detection in Videos," IEE Transactions on Multimedia, vol. 23, 2021, pp. 4106-4116.
Wang, et al. "Image Anomaly Detection Using Normal Data Only by Latent Space Resampling," Appl. Sci., vol. 10, 2020, 19 pages.
Zhao, et al. "Anomaly Detection for Images Using Auto-encoder Based Sparse Representation," Topics in Cryptology CT-RSA 2020, Jun. 17, 2020, pp. 144-153.

* cited by examiner

METHOD FOR VIDEO-BASED PATCH-WISE VECTOR QUANTIZED AUTO-ENCODER CODEBOOK LEARNING FOR VIDEO ANOMALY DETECTION

CROSS-REFERENCE TO RELATED APPLICATION(S)

The present application claims priority to and the benefit of U.S. Provisional Patent Application No. 63/395,782 filed on Aug. 5, 2022, the entire contents of which are incorporated by reference herein.

FIELD

The present application generally relates to detecting anomalies, and more particularly to video-based vector quantized auto-encoder codebook learning for video anomaly detection.

BACKGROUND

In recent years, manufacturing factories are commonly monitored with hundreds or thousands of Closed Circuit Televisions (CCTVs) for production and infrastructure safety. Human-based CCTV anomaly detection is extremely tedious and time-consuming due to the pervasive use of surveillance cameras coupled with the growth of video data. Intelligent CCTV's powered with AI technology have been introduced in an attempt to reduce manual surveillance through automatic anomaly detection.

A first challenge with intelligent CCTV's powered with AI, among other aspects, are the extremely imbalanced data samples in a dataset with few, if any, anomaly videos. In this way, the ratio between "normal" samples and an "anomaly" samples are extremely imbalanced. Deep learning may require a balanced dataset to achieve an effective output or performance. Training on an imbalanced data would likely degrade the performance of deep learning and the predicted result would bias toward the normal sample.

A second challenge that intelligent CCTV's powered with AI presents is the low-resolution of anomalies within the CCTV frames. Tiny anomalies within the whole CCTV frame stream remains a detection issue.

As such, there exists a need to achieve a higher accuracy of CCTV anomaly detection using only normal video data and to achieve a higher accuracy of anomaly detection under varying resolution of anomalies.

The above information in the Background section is only for enhancement of understanding of the background of the technology and therefore it should not be construed as admission of existence or relevancy of the prior art.

SUMMARY

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

Aspects of example embodiments of the present disclosure relate to vector quantized auto-encoder codebook learning for manufacturing display extreme minor defects detection.

(A1) In one or more embodiments, a system includes: a memory, an encoder, a decoder and a processor. The system is operable to receive, at the encoder, an input video, divide, by the encoder, the input video into a plurality of video patches, select, by the encoder, codes corresponding to the plurality of video patches of the input video, from a codebook comprising the codes, determine, by the encoder, an assigned code matrix comprising the codes corresponding to the plurality of video patches of the input video, receive, by the decoder, the assigned code matrix from the encoder; and generate, by the decoder, a reconstructed video based on the assigned code matrix.

(A2) The system of (A1), wherein the codes corresponding to the plurality of video patches of the input video are selected from the codebook using a look-up function, wherein the look-up function, the codebook, and the assigned code matrix are stored in the memory.

(A3) The system of (A2), wherein the system is further operable to: extract, by the encoder, latent features from the plurality of video patches of the input video; and determine, by the encoder, a latent features matrix comprising the latent features extracted from the plurality of video patches of the input video.

(A4) The system of (A3), in which the look-up function is operable to select a nearest code as an assignment for each of the latent features in the latent feature matrix to determine the assigned code matrix.

(A5) The system of (A3), wherein the encoder is operable to select a code corresponding to a video patch of the plurality of video patches of the input video from the codebook by comparing similarity measures between a latent feature representation of the video patch in the latent feature matrix and a corresponding code in the codebook.

(A6) The system of (A5), wherein the similarity measures comprise a Euclidean distance or a mahalanobis distance between the latent feature representation of the video patch in the latent feature matrix and the corresponding code in the codebook.

(A7) The system of (A1), wherein the assigned code matrix comprises the codes corresponding to the plurality of video patches of the input video.

(A8) The system of (A7), in which a code from among the codes in the assigned code matrix is assigned to a video patch of the plurality of video patches of the input video based on a vector quantization of a latent feature corresponding to the video patch.

(A9) The system of (A8), wherein a vector quantization loss of the system comprises a reconstruction loss that occurs during generation of the reconstructed video and a loss that occurs during the vector quantization of latent features corresponding to the plurality of video patches of the input video.

(A10) The system of (A9), further comprising: a patch-wise discriminator network operable to operate as a generative adversarial network to determine an adversarial training loss between the input video and the reconstructed video.

(A11) The system of (A10), wherein a total loss of the system in generating the reconstructed video from the input video comprises the vector quantization loss and the adversarial training loss.

(A12) The system of (A1), further operable to: receive, by the encoder, a test input video; divide, by the encoder, the test input video into a plurality of video patches; extract, by the encoder, latent features from the plurality of video patches of the test input video; encode, by the encoder, each of the plurality of video patches into a latent feature vector based on the extracted latent features; assign, by the encoder, a code to each of the plurality of video patches to determine assigned codes of the plurality of video patches, determine, by the encoder, a patch-set comprising the assigned codes, determine, by the encoder, an anomaly score of each of the assigned codes of the patch-set, compare, by the encoder, the anomaly score of each of the assigned codes of the patch-set with a threshold and determine, by the encoder, a defect in one or more of the plurality of video patches based on a result of a comparison.

(A13) The system of (A12), wherein a code from the codebook that is of a shortest distance to the latent feature vector of a video patch of the plurality of video patches among the codes in the codebook is assigned to the video patch.

(A14) The system of (A12), wherein the anomaly score of each of the assigned codes of the patch-set is determined based on a probability density function.

(B1) A method comprising: receiving, at an encoder, an input video, dividing, at the encoder, the input video into a plurality of video patches, selecting, by the encoder, codes corresponding to the plurality of video patches of the input video, from a codebook comprising the codes; determining, by the encoder, an assigned code matrix comprising the codes corresponding to the plurality of video patches of the input video; receiving, by a decoder, the assigned code matrix from the encoder; generating, by the decoder, a reconstructed video based on the assigned code matrix.

(B2) The method of (B1), in which the codes corresponding to the plurality of video patches of the input video are selected from the codebook using a look-up function, wherein the method further comprises: extracting, by the encoder, latent features from the plurality of video patches of the input video; and determining, by the encoder, a latent features matrix comprising the latent features extracted from the plurality of video patches of the input video.

(B3) The method of (B2), wherein the look-up function is operable to select a nearest code as an assignment for each of the latent features in the latent feature matrix to determine the assigned code matrix, and wherein the encoder is operable to select a code corresponding to an video patch of the plurality of video patches of the input video from the codebook by comparing similarity measures between a latent feature representation of the video patch in the latent feature matrix and a corresponding code in the codebook.

(B4) The method of (B3), wherein a code from among the codes in the assigned code matrix is assigned to an video patch of the plurality of video patches of the input video based on a vector quantization of a latent feature corresponding to the video patch, wherein a vector quantization loss comprises a reconstruction loss that occurs during generation of the reconstructed video and a loss that occurs during the vector quantization of latent features corresponding to the plurality of video patches of the input video, and wherein a total loss for generating the reconstructed video from the input video comprises the vector quantization loss and an adversarial training loss.

(B5) The method of (B1), further comprising: extracting, by the encoder, latent features from the plurality of video patches of the input video, encoding, by the encoder, each of the plurality of video patches into a latent feature vector based on the extracted latent features, assigning, by the encoder, a code to each of the plurality of video patches to determine assigned codes of the plurality of video patches, determining, by the encoder, a patch-set comprising the assigned codes, determining, by the encoder, an anomaly score of each of the assigned codes of the patch-set, compare, by the encoder, the anomaly score of each of the assigned codes of the patch-set with a threshold and determine, by the encoder, a defect in one or more of the plurality of video patches based on a result of a comparison.

(C1) A non-transitory computer readable storage medium operable to store instructions that, when executed by a processor included in a computing device, cause the computing device to, receive, at an encoder of the computer device, an input video, divide, at the encoder, the input video into a plurality of video patches, select, by the encoder, codes corresponding to the plurality of video patches of the input video, from a codebook comprising the codes, determine, by the encoder, an assigned code matrix comprising the codes corresponding to the plurality of video patches of the input video, receive, by a decoder of the computer device, the assigned code matrix from the encoder; and generate, by the decoder, a reconstructed video based on the assigned code matrix.

(C2) A non-transitory computer readable storage medium operable to store instructions that, when executed by a processor included in a computing device, cause the computing device to perform any of (A2-14).

BRIEF DESCRIPTION OF THE DRAWINGS

These and other features of some example embodiments of the present disclosure will be appreciated and understood with reference to the specification, claims, and appended drawings, wherein:

Aspects, features, and effects of embodiments of the present disclosure are best understood by referring to the detailed description that follows. Unless otherwise noted, like reference numerals denote like elements throughout the attached drawings and the written description, and thus, descriptions thereof will not be repeated. In the drawings, the relative sizes of elements, layers, and regions may be exaggerated for clarity.

DETAILED DESCRIPTION

The detailed description set forth below in connection with the appended drawings is intended as a description of some example embodiments of a system and a method for CCTV anomaly detection provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the scope of the present disclosure.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the present disclosure. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the present disclosure refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

In some embodiments, one or more outputs of the different embodiments of the methods and systems of the present disclosure may be transmitted to an electronics device coupled to or having a display device for displaying the one or more outputs or information regarding the one or more outputs of the different embodiments of the methods and systems of the present disclosure.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), formed on one substrate or other appropriate architectures. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present disclosure.

Figure 1:
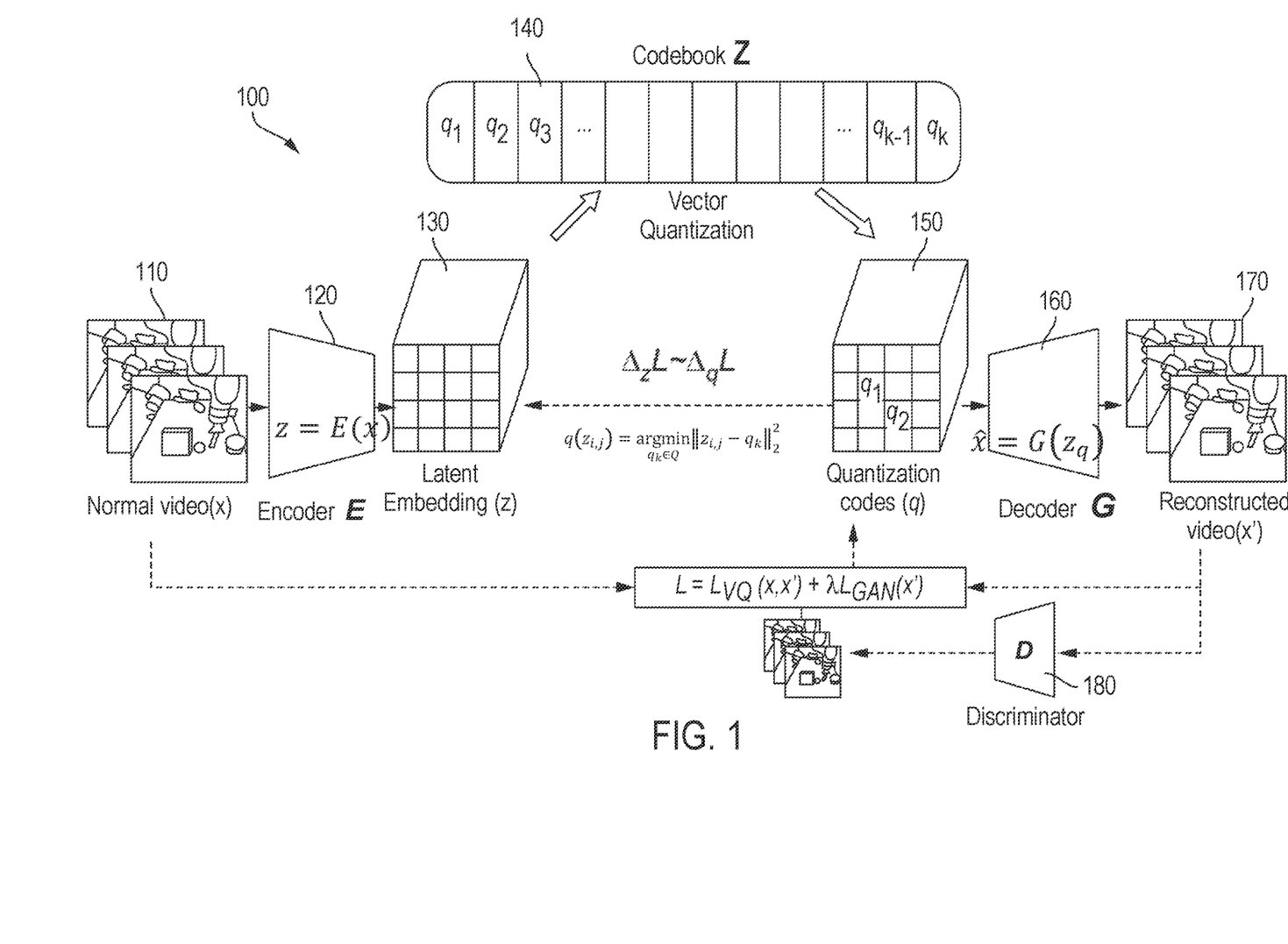
FIG. 1 illustrates a codebook learning of a video-based patch-wise vector-quantized auto-encoder (VBPVQAE) system, in accordance with some embodiments.
Figure 2A:
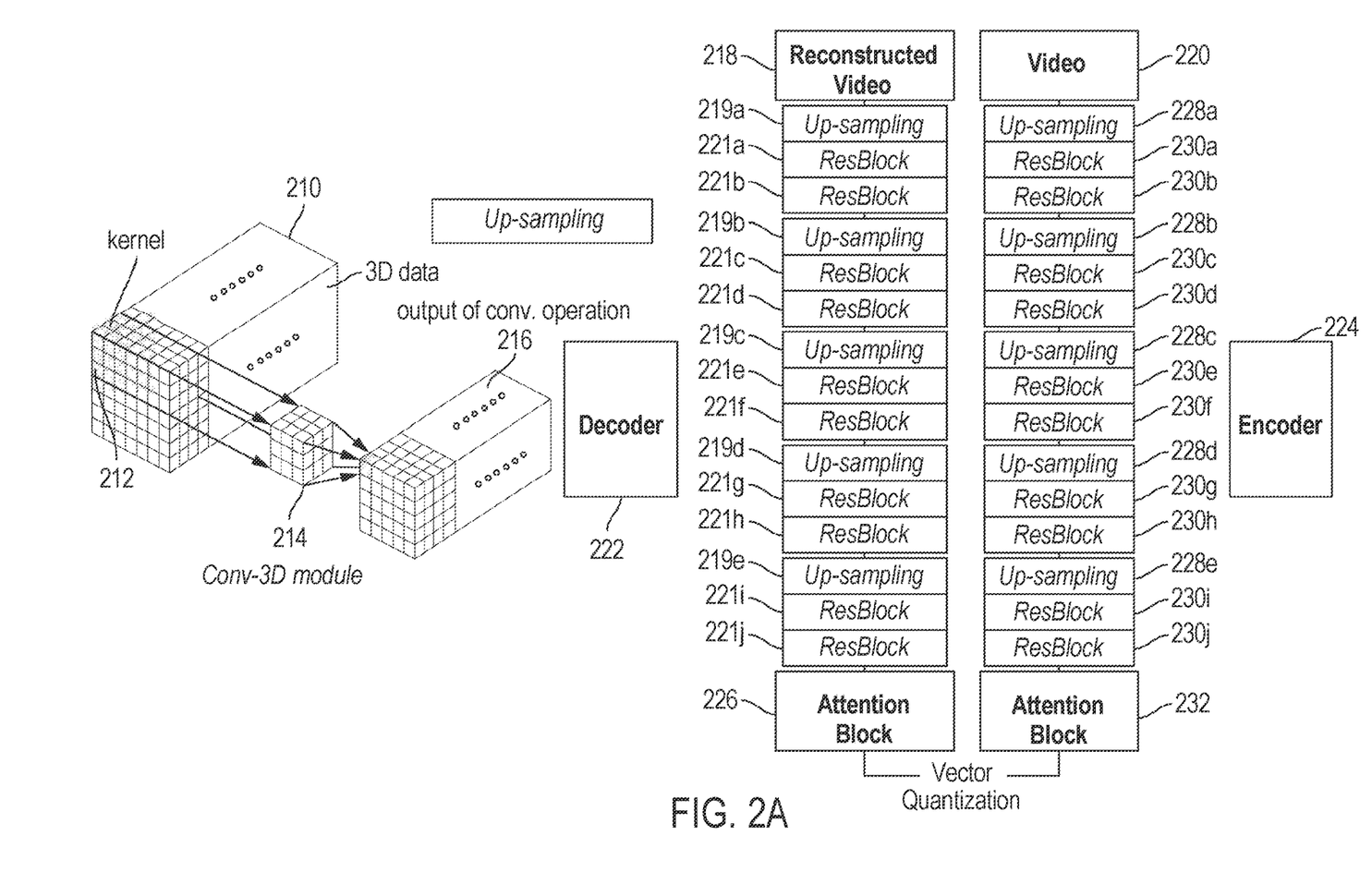
FIG. 2A illustrates a block module for a 3D convolutional encoder backbone model of the VBPVQAE system of FIG. 1, in accordance with some embodiments.
Figure 2B:
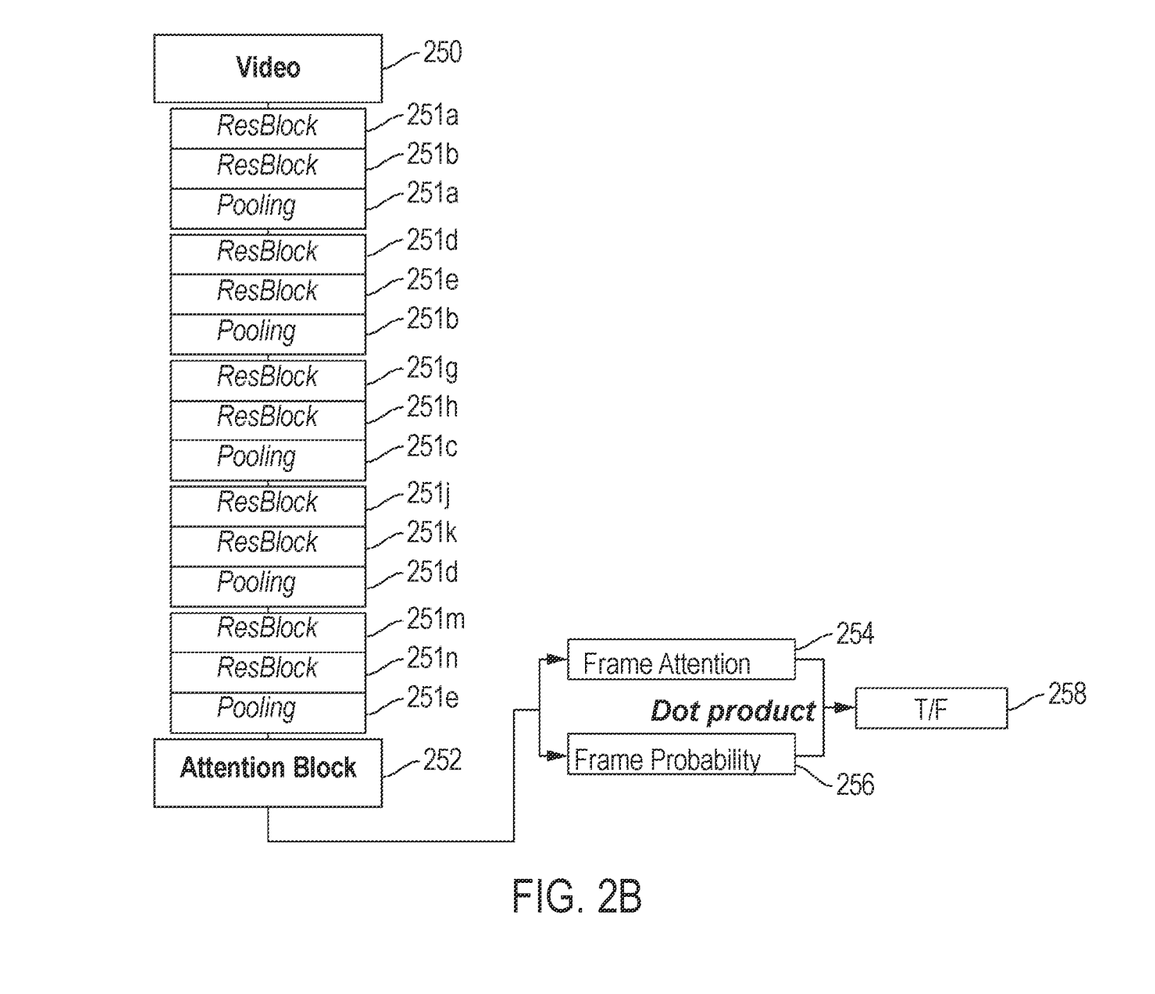
FIG. 2B illustrates a block module for a 3D convolutional discriminator backbone model of the VBPVQAE system of FIG. 1, in accordance with some embodiments.
Figure 3:
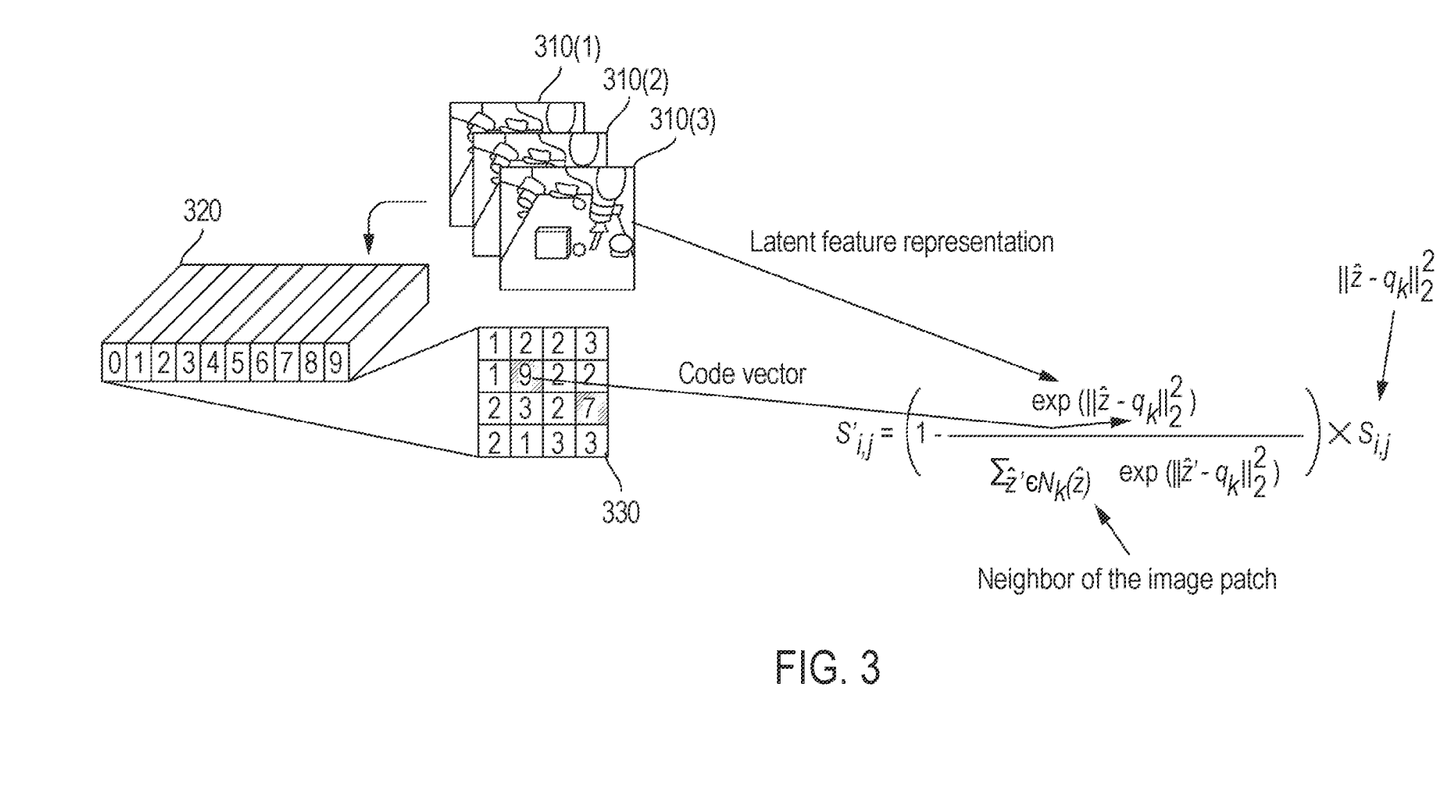
FIG. 3 illustrates anomaly detection using patch-wise codebook learning, in accordance with some embodiments.
Figure 5:
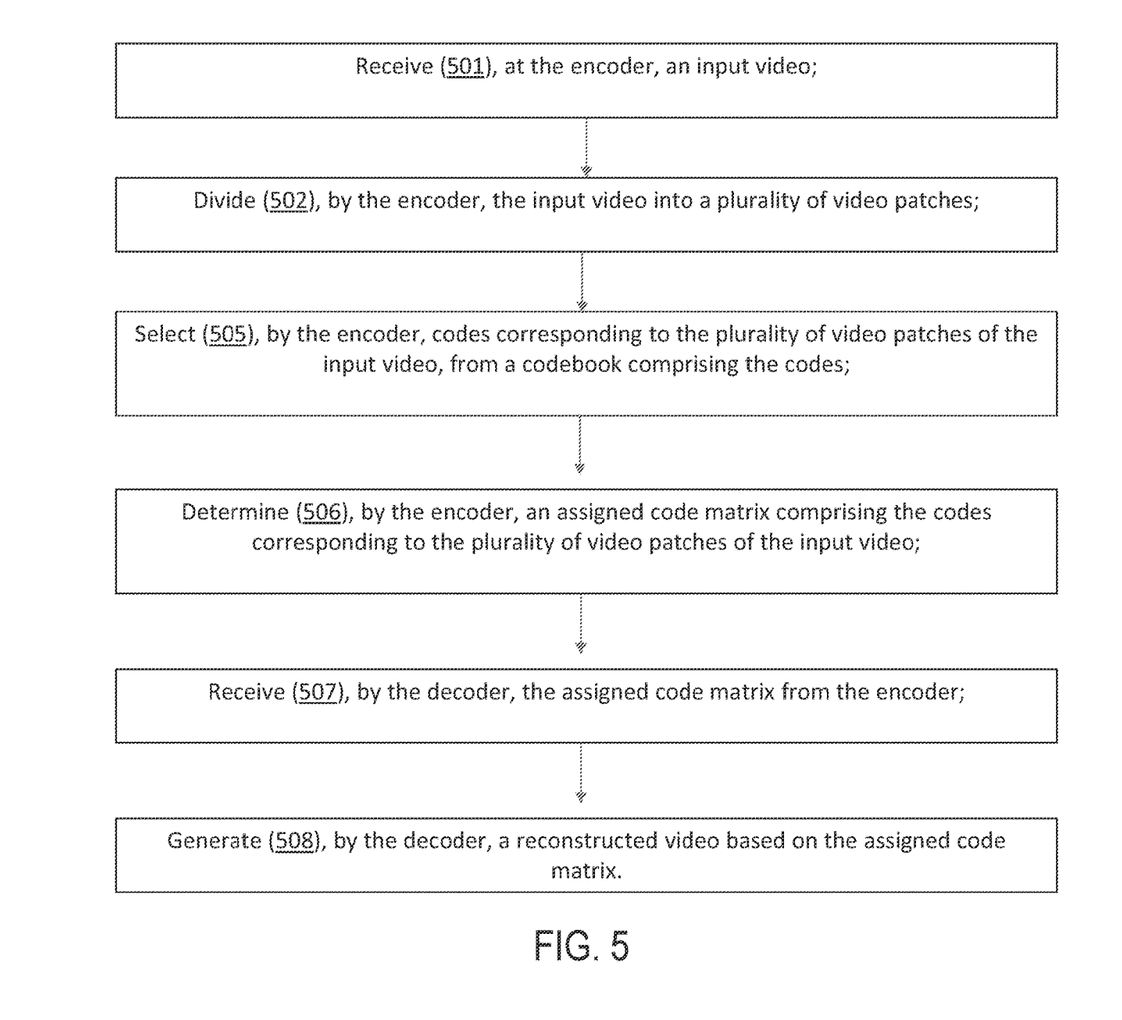
FIG. 5 illustrates a method for anomaly detection using the VBPVQAE system, in accordance with some embodiments.

As discussed previously, there exists a need to achieve a higher accuracy of CCTV anomaly detection using only normal video data. Additionally, as discussed previously, there also exists a need to achieve a higher accuracy of anomaly detection rates under varying resolution of anomalies. This may be achieved, as described herein by (i) designing and building a patch-wise anomaly detection model to learn the pattern of normal scenarios, to improve the identification of tiny anomalies in local patches as (as shown in FIG. 1) and the architecture of the learning models (as shown in FIG. 2A and FIG. 2B), (ii) performing a detailed examination on each small patch and identifying whether anomalies exist or not as shown in FIG. 3, and (iii)

performing temporal dependency analysis to find the correlation between patches across different time-frames as shown in FIG. 5.

Table 1 depicts performance on existing datasets. "AUROC" is "area under the receiver operating characteristic." VBPVQAE has the highest performance, owing to the novel method presented herein. Specifically, VBPVQAE can identify the local anomaly together with anomalies that happens for a long duration (e.g., time dependent). However, the other methods including OCNN, OCELM and OCSVM cannot consider this anomaly pattern. OCELM refers to a One-class Extreme Learning Machine, OCNN refers to a One-class Neural Network and OCSVM refers to a One-class Support Vector Machine.

TABLE 1

| AUROC  | OCELM | OCNN  | OCSVM | VBPVQAE |
|--------|-------|-------|-------|---------|
| UCF-101 | 0.947 | 0.934 | 0.905 | 0.983   |

It should be noted that "anomaly" and "defect" may be used interchangeably herein. Object anomalies include, but are not limited to, fires, natural disasters, smoke scenarios and persistent anomaly objects such as waste, hazardous items, on the site scenarios. Activity anomalies include, but are not limited to, human misbehaviors. In some embodiments, this can be achieved by designing and building models to achieve high defect detection accuracy using only normal data samples. In other embodiments, this can be achieved by minimizing the impact of imbalanced distribution of normal and defect data on the deep learning model.

One or more embodiments of the present disclosure may provide a solution to the challenges in the defect detection using machine learning by a Video-based Patch-Wise Vector-Quantized Auto-Encoder (VBPVQAE) system that is trained on video. In one or more embodiments, the VBPVQAE system may mitigate the above mentioned challenges of defect detection. VBPVQAE divides the video frames into sequences of patches across time and learns a codebook from the video patches. A code in the codebook represents the feature pattern of a video patch. In this way, latent features from the video patches may be extracted. The codebook is learned through the vector quantization technique. Codes can then be assigned to each learned latent feature from codes assigned to the video patches, by the distance of the patch's latent features to the assigned code. VBPVQAE system can achieve state-of-the-art performance on defect detection.

Following the research of one-class methods, in one or more embodiments, the VBPVQAE system of the present disclosure may be trained without anomaly data. In one or more embodiments, the VBPVQAE system may use vector quantization. Vector quantization is a technique that enables the learning of expressive representations stored in a discrete codebook. In one or more embodiments, the context-rich codebook may contribute to state-of-the-art performance in many vision tasks, including video generation and synthesis. Moreover, the codebook can be easily integrated into generative models as an end-to-end framework. By introducing this technique to the one-class auto-encoder architecture, in one or more embodiments, the VBPVQAE system learns distinctive normal representations in an end-to-end fashion. In addition, the high expressivity of the learned codebook may allow the VBPVQAE system to be trained for multiple objects incorporating a vast span of visual patterns. As such, the VBPVQAE system of the present disclosure may eliminate the need for extra tuning and dataset-specific trade-offs and may alleviate the burden to train multiple models.

In one or more embodiments, with a convolutional neural network (CNN) as the encoder, each codebook entry may attend to localized visual patterns in a video. Unlike natural videos, videos captured in manufacturing settings usually involve complex yet similar patterns distributed across video constituents. Based on this observation, the retention of global information may be needed in codebook learning. In one or more embodiments, in case of vision transformer and variations, the multi-head attention (MHA) mechanism may have superior capability in capturing the relationship between long-range contexts. In one or more embodiments, MHA and CNN may be combined as the encoder backbone to enhance local and global information expression.

Based on the learned codebook, the one-class detection framework or VBPVQAE system of the present disclosure may calculate the anomaly score for each video patch by generating the posterior probability on retrieved codes, and identify the defect through the value of the anomaly score.

In one or more embodiments, the VBPVQAE system of the present disclosure consists of two parts: (1) a patch vector-quantization auto-encoder that learns a codebook incorporating representations of the normal data, and (2) a defect detector that identifies defects based on the learned codebook. The VBPVQAE system of the present disclosure quantizes latent features into indices of a codebook. For example, the VBPVQAE system of the present disclosure may train an encoder network to build a discrete embedding table as well as a decoder network that utilizes the index in the embedding table for the reconstruction of each video patch (e.g., see FIG. 1). Both the encoder and decoder may be convolutional neural networks (CNNs) and multi-head attention blocks (e.g., transformers). At test time, the encoder-decoder pair may utilize the learned codebook to generate an index matrix for all patches in the test video. By looking at the joint probability of codes corresponding to the indices, the defect detector calculates a score matrix that can be used for patch-wise defect identification.

As such, one or more embodiments of the present disclosure provide a VBPVQAE system for one-class defect detection problems in manufacturing. The VBPVQAE system of the present disclosure may be trained on normal data and critically, under varying resolution of anomalies, hence largely reducing the need for defect samples at the training time. The principle of the VBPVQAE system is based on learning and matching normal representations in a learned codebook. By leveraging the vector quantization technique, codebook learning in an end-to-end fashion may be achieved. VBPVQAE system of the present disclosure may eliminate complicated tuning or trade-offs that are specific to different datasets. In one or more embodiments, representation learning of global context may also be enhanced by combining the CNN encoder and multi-head self-attention mechanism. This approach may lead to a successful encoding of a wide range of visual patterns. In one or more embodiments, the high expressivity of the codebook may help to achieve representation learning for different objects using a single model. In addition, in one or more embodiments, the context-rich codebook may further benefit other downstream tasks such as video reconstruction or synthesis of normal videos.

FIG. 1 illustrates a codebook learning of the VBPVQAE system of the present disclosure.

VBPVQAE system 100 quantizes latent features into a codebook of entries, (i.e. a latent feature matrix) with a pair of encoder (E) and decoder (G) networks. For example, VBPVQAE system 100 uses vector quantization to learn a codebook for the whole dataset, thus the dataset can be expressed by the codebook. In one or more embodiments, a code represents the display panel's video patches' features.

For example, at training, the encoder (E) 120 reads in videos (e.g., video (x) 110) and extracts and stores visual patterns into a codebook (Q) 140, whereas the decoder (G) 160 aims to select a proper code index for each video patch and tries to reconstruct the input videos based on the selected codes.

In one or more embodiments, the latent embedding codebook (Q) 140 may be represented as Q∈R(K×nz), where K is the number of the discrete codes in the codebook, and nz is the dimensionality of the latent embedding vector qk∈R (nz), k∈1, 2, . . . , K.

For example, during training of the VBPVQAE system 100, as shown in FIG. 1, the encoder (E) 120 receives a video (x) 110, where x∈R(H×W×T×3) and outputs the latent feature matrix (z) 130. Here, H is the height of the video (x) 110, W is the width of the video (x) 110, T is the time of video (x) 110 and number "3" represents the number of channel of the video (x) 110 (e.g., red, green, blue).

For example, in the method of FIG. 1, when the input video (x) is received at the encoder (E), the input video (x) may be divided into a plurality of video patches. In one or more embodiments, a latent feature from each of the plurality of patches may be extracted to determine the latent feature matrix (z) 130, where z∈R (h×w×nz) and z=E(x). Here, h is the height of the latent feature matrix (z) 130, w is the width of the latent feature matrix (z) 130, and nz represents the hidden vector size of the latent feature matrix (z) 130.

For example, after the latent feature matrix (z) 130 is determined by the encoder (E) 120, vector quantization may be used to learn the codebook (Q) 140 to assign a code from the codebook (Q) 140 to each of the plurality of latent features of the latent feature matrix (z). Here, each of the latent features in the latent feature matrix (z) corresponds to each patch of the plurality of patches from the input video (x). In some embodiments, a patch is a sub-tensor of the video tensor. For example a video tensor matrix may be defined as $V \in R^{H,W,T,C}$ where H is height, W is width, T is time, C is channel. A patch $v_{h:h+\delta h, w:w+\delta w, t:t+\delta t, c}$ is part of the video tensor matrix, V, where δh, δw, δt refers to the corresponding step size.

In one or more embodiments, the VBPVQAE system 100 may further include a memory and a processor, and the latent feature matrix (z) 130 may be determined by the processor based on the latent features extracted from the plurality of video patches and in one or more embodiments, the latent feature matrix (z) 130 may be stored in the memory of the VBPVQAE system 100.

For example, after the latent feature matrix (z) 130 is determined by the encoder (E) 120, in the forward pass, a code for each video patch is selected (or assigned) from the codebook (Q) 140 using a look-up function q(.) by the encoder (E) 120 or the processor of the VBPVQAE system 100. In one or more embodiments, the look-up function q(.) and the codebook (Q) 140 may be stored in the memory of the VBPVQAE system. By comparing the similarity measures (e.g., Euclidean distance, mahalanobis distance, etc.) between the latent feature representation of an input video patch in the latent feature matrix (z) 130 and each code in the codebook (Q) 140, the look-up function q(.) selects the nearest code as an assignment for each latent feature in the latent feature matrix (z) 130 to generate the assigned code matrix (q) 150. For example, in one or more embodiments, by comparing the Euclidean distance between the latent feature representation of an input patch in the latent feature matrix (z) 130 and each code in the codebook (Q) 140, the look-up function q(.) selects the nearest code as an assignment for each latent feature in the latent feature matrix (z) 130. In one or more embodiments, the assigned code matrix (q) 150 may be generated by the encoder (E) 120 or by the processor of the VBPVQAE system 100.

For example, an assignment in the assigned code matrix (q) 150 may be represented as:

$$z_q^{i,j} = q(z_{i,j}) = \mathrm{argmin} \|z_{i,j} - q_k\|_2^2 \qquad (1)$$

For example, $z_q^{i,j}$ may represent an element of the assigned code matrix (q) 150.

For example, in one or more embodiments, a code may be assigned to each input video patch based on vector quantization of the latent feature corresponding to the input video patch. For example, in the codebook learning of the VBPVQAE system 100, the concept of vector quantization may be used while determining the assigned code matrix (q) 150 by selecting a code for each video patch from the codebook (Q) 140 with a look-up function q(.).

The assigned code matrix (q) 150 is then passed to the decoder (G) 160 to generate a reconstructed video or a reconstructed input video (x̂) from the elements of the assigned code matrix (q) 150. In one or more embodiments, the assigned code matrix (q) 150 has the same shape as the latent feature matrix (z) 130. For example, the assigned code matrix (q) 150 may be the quantized version of the latent feature matrix (z) 130. The assigned code matrix (q) 150 is then passed into the decoder (G) 160, which is an unsampling network that takes in the h×w×nz feature matrix and output HXWX3 video.

In one or more embodiments, the reconstructed input video (x̂) may be represented as:

$$\hat{x} = G(z_q) = G(q(E(x))) \qquad (2)$$

The difference between reconstructed video (x̂) and the corresponding input video x is used as the guidance for the VBPVQAE system 100.

In one or more embodiments, the argmin operand is not differentiable during backpropagation. The gradient of this step may be approximated by using the straight-through estimator (STE) and directly pass the gradients from q(z) to z, so that the reconstruction loss may be incorporated with the loss for the neural discrete representation learning. As such, the vector quantization loss function may be represented as:

$$L_{VQ}(E,G,Z) = \|\hat{x}-x\|_2^2 + \|sg[E(x)]-q\|_2^2 + \beta\|sg[E(x)]-q\|_2^2 \qquad (3)$$

In equation (3), the first term $\|\hat{x}-x\|_2^2$ represents the reconstruction loss (e.g., the loss during the generation of the reconstructed video (x̂)). Also, in equation (3), the second and third terms $\|sg[E(x)]-q\|_2^2 + \beta\|sg[E(x)]-q\|_2^2$ represent vector quantization losses.

Further, in equation (3), the sg function sg[E(x)] represents the stop gradient operand that enables the zero partial derivatives, q is the code embedding, and β is the hyperparameter.

In one or more embodiments, adversarial training may be incorporated in the codebook learning to enhance the expressivity of learned embedding's in the latent feature space. For example, in one or more embodiments, as shown in FIG. 1, a patch-wise discriminator network (D) 180 may be added to the encoder-decoder framework (e.g., including the encoder (E) 120 and decoder (G) 160) as in the generative adversarial network (GAN). An adversarial training loss $L_{GAN}$ may also appended to encourage the VBPVQAE system 100 to differentiate between the original video (x) 110 and the reconstructed video (x̂) 170. In one or more embodiments, the patch-wise discriminator network (D) 180 may determine the adversarial training loss $L_{GAN}$ and the total loss L of the VBPVQAE system 100.

The adversarial training loss between the original input video (x) 110 and the reconstructed video (x̂) 170 may be represented as:

$$L_{GAN}((E,G,Q),D) = \log(D(x)) + \log(1-D(\hat{x})) \quad (4)$$

As a whole, the total loss of the VBPVQAE system 100 training is:

$$L = \arg\min_{E,G,Q} \max_D L_{VQ}(E,G,Z) + \lambda L_{GAN}((E,G,Q),D) \quad (5)$$

In one or more embodiments, equation (5) or the term "L" may represent the total loss of the VBPVQAE system 100 during training. For example, the term "L" in equation (5) essentially incorporates the vector quantization loss "$L_{VQ}$ (E, G, Z)" and the GAN loss or the adversarial training loss between the original video (x) 110 and the reconstructed video (x̂) 170 "$L_{GAN}$ ((E, G, Q), D)". In equation (5) "λ" is the hyperparameter that can be adaptively tuned.

In one or more embodiments, real-world videos from production line may incorporate sophisticated visual patterns that contain subtle defective traits. In order to learn an effective codebook from such complex datasets, it may be desirable to adopt a model that can concurrently (e.g., simultaneously) learn local features and understand the global composition of these local features. By encoding the information of both perspectives, the product video can be represented by a series of locally vivid as well as globally coherent perceptional codes. In order to achieve this, on top of convolutional layers, the multi-head self-attention layer may be adopted to learn the inter-correlation dependencies between elements within a sequence (i.e. words for language tasks or video patches for vision tasks). As a consequence, the VBPVQAE system 100 can learn a codebook with richer perceptions of complex industrial products.

FIG. 2A is a block module representation for an example 3D convolutional encoder backbone model and FIG. 2B is a block module for an example 3D convolutional discriminator backbone model of the VBPVQAE system of FIG. 1, in accordance with some embodiments. It is to be noted, that model, as used herein, can also be interpreted as system architecture.

Input sensor 210 represents the input to the block module. Sub-tensor 212 is a sub-tensor of the input sensor 210 and represents the local representation of the input sensor 210. Convolutional kernel 214 convolutes the sub-tensor 212.

Output 216 is the output of convolute operation 212 and 214. Decoder 222 is the backbone to reconstruct the original videos. Decoder 222 reconstructs the original videos from the quantized compressed representation.

Reconstructed video 218 is the output of the decoder 222. Reconstructed video 218 reconstructs the original input video 220, as explained in FIG. 1. Up sampling blocks 219*a-e* may include bilinear sampling, interpolation sampling, etc., to up sample from lower resolution, few frames, to higher resolution and more time frames.

Residual Block 221*a-j* are Residual Network 3D blocks, which constitute the residual connection of the block module. Residual Block 221*a-j* function to convolute the input tensors. Attention block 226 is a multi-head attention block. It is used to redistribute the tensor weight along both spatial and temporal dimensions according to the learned importance of the tensor. Video 220 is input video, which, in some embodiments, provides the information/pattern to be learned by the neural networks. Down-sampling blocks 228*a-e* of video 220 compress the dimension of the tensors (i.e. through the epooling layer, including maxpooling, average pooling and etc.).

Residual Block 230*a-j* are Residual Network 3D blocks as well. Residual Block 230*a-j* convolute the input tensors. Attention block 232 is a multi-head attention block to redistribute the weight along spatial and temporal dimensions.

FIG. 2B is a block module for the 3D convolutional discriminator backbone model which helps identify if a video is from the reconstructed video 218 or the original video 220, as shown in FIG. 2A, resulting in an improvement of the encoder and decoder training.

Video 250 may be the original video or reconstructed vector quantized video.

Residual block 251*a-n* are Residual Network 3D blocks as well. In some embodiments, residual blocks 251*a-n* convolute the tensors. Pooling 251*a-e* are the down-sampling layers. In some embodiments, pooling 251*a-e* down-sample the input tensor, which may include max-pooling, average pooling, etc.

Frame attention 254 is the weight assigned to each frame, (i.e. contribution of each frame for the final prediction). Frame probability 256 is the probability of each frame, whether the input tensor is reconstructed or original. Output 258 is the output of the network, which predicts whether the input video is reconstructed or original.

In one or more embodiments, VBPVQAE system 100 may also determine defects in a system. For example, FIG. 3 illustrates defect detection using video-based patch-wise codebook learning. For example, referring back to FIG. 1, given an input video, (x), at the test phase, the trained VBPVQAE system 100 may identify defects by estimating the anomaly score $s_{i,j}$ for each video patch (e.g., 310(1), 310(2), 310(30) ..., 310(n)) indexed at i, j from the assigned codes $z_q$.

As in the training phase, in the embodiment of FIG. 3, an input video, (x), at the test phase may be divided into a plurality of video patches. Next, latent features from the plurality of video patches of the input video (x) at test may be extracted, and a video patch of the plurality of video patches may be encoded into the latent feature vector ẑ (shorthand for $z_{i,j}$) by the encoder (E) 120.

In FIG. 3, the elements 310(1), 310(2), 310(3) ... represent the latent feature vector ẑ representation of the video patches of the input video x at the test phase. Then $k^{th}$ code from the codebook (Q) 320 that is of the shortest distance to the latent feature vector ẑ among all the codes in the codebook (Q) 320 (e.g., based on the similarity measure between the latent feature vector ẑ representation of the input video patch and the $k^{th}$ code from the codebook (Q) 320) is assigned to the video patch (e.g., 310(1), 310(2), 310(3) ..., 310(n)) by the encoder (E) 120. In one or more embodiments, the $k^{th}$ code from the codebook (Q) 140 may be represented as:

$$k = \arg\min_{k \in 1,2,\ldots,K} \|\hat{z} - q_k\|_2^2 \quad (6)$$

With all video patches, the latent feature vector ẑ is extracted and a patch-set 330 of the corresponding codes is determined by the encoder (E) 120. The patch-set 330 of the corresponding codes may be represented as:

$$\{\hat{z} | \arg\min_{k \in 1,2,\ldots,K} \|\hat{z} - q_k\|_2^2 = k\}_{k=1,2,\ldots K} \quad (7)$$

In one or more embodiments, the patch-set 330 may include the assigned codes corresponding to each of the plurality of video patches (e.g., 310(1), 310(2), 310(3)).

For each entry in the patch-set 330, an anomaly score $s_{i,j} \in R$ may be calculated using either the probability density function $s_{i,j}=P(\hat{z})$, or weighted distance to the k nearest-neighbors in the patch-set 330. For example, in FIG. 3, an anomaly scoring matrix (s) 340 incorporates the anomaly score $s_{i,j}$ for each entry in the patch-set 330. In one or more embodiments, the anomaly score $s_{i,j}$ may be represented as:

$$s_{i,j} = \left(1 - \frac{\exp\left(\|\hat{z} - q_k\|_2^2\right)}{\sum_{\hat{z}' \in N_k(\hat{z})} \exp\left(\|\hat{z} - q_k\|_2^2\right)}\right) \times s_{i,j} \quad (8)$$

In one or more embodiments, the patch-wise anomaly score $s_{i,j}$ may be reorganized into the anomaly scoring matrix (s) 340 according to the spatial location of the anomaly scores $s_{i,j}$. In one or more embodiments, the anomaly score $s_{i,j}$ may be calculated by the encoder (E) 120.

In one or more embodiments, during the defect detection, an input sample is determined to be defective if any of the anomaly scores $s_{i,j}$ is larger than a given threshold at index k, which may be represented as:

$$\Pi(s_{i,j} > t_k) \forall s_{i,j} \in s \quad (9)$$

Figure 4:
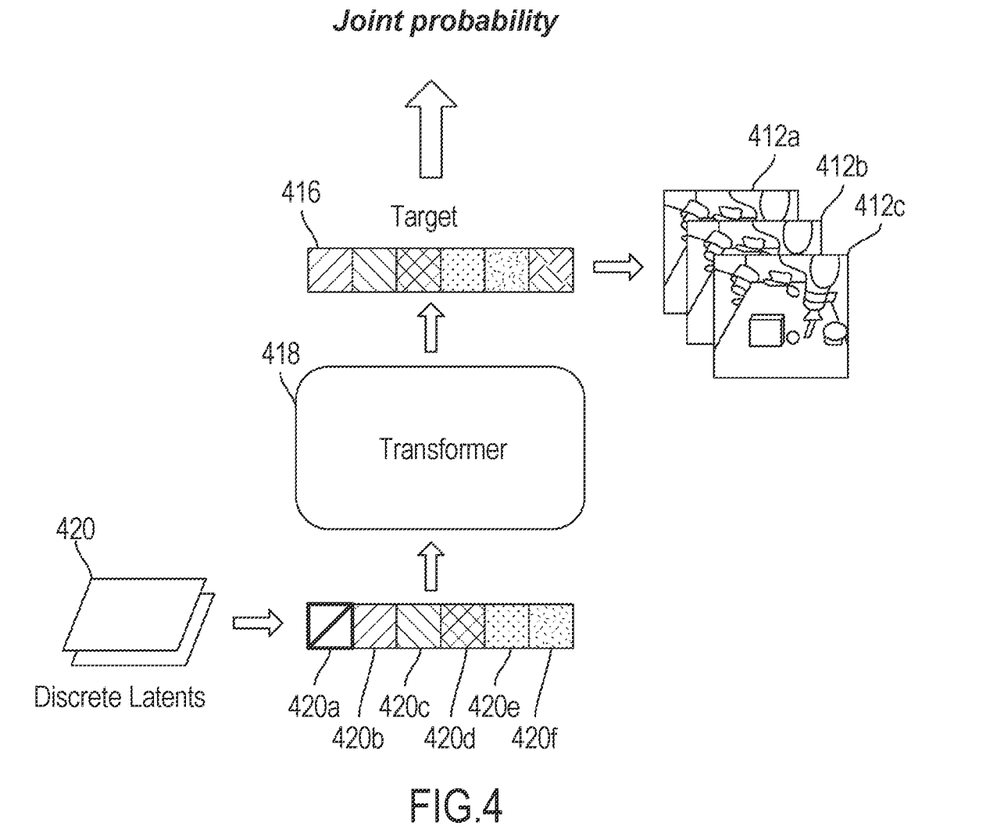
FIG. 4 illustrates anomaly detection using learned spatial-temporal dependency, in accordance with some embodiments.

FIG. 4 illustrates defect detection with learned spatial-temporal dependency. Discrete latents 420*a-f* represent all frames local patches' feature representation along spatial and temporal dimensions through the learned code. Transformer 418 learns the spatial and temporal correlation between these codes from normal videos, and takes in the sequence of latent codes to learn the correlation through self-supervised learning tasks including predicting the masked code, predicting next sequence and etc. The output target's probability presents how normal the input sequence are. Output sequence 416*a-f* are the output sequence from the transformer. Output sequence 416*a-f* show the quality of sequence reconstruction. The joint probability of the sequence shows how normal the input sequence to identify the temporal related anomalies as well as anomalies with large resolution. In some embodiments, the transformer generates a code level probability for each code in the sequence. By calculating the joint probability (product of the code probability) of the code sequence, the level of normalness of the code sequence may be identified, to identify the temporal related anomalies as well as anomalies with large resolution. Normal code sequence may have a high probability to be obtained while abnormal code sequence may have a low probability. Images 412*a-c* function are used to reconstruct the original video from the sequence thus can be used for human inspection.

FIG. 5 illustrates a method for defect detection using the VBPVQAE system 100.

For example, at 501, an input video may be received at an encoder, and at 502, the input video may be divided into a plurality of video patches. For example, as discussed with respect to FIG. 1, when the input video (x) is received at the encoder (E) 120, the input video (x) may be divided into a plurality of video patches.

The latent features from the plurality of video patches of the input video may be extracted by the encoder, and, a latent features matrix including the latent features extracted from the plurality of video patches of the input video may be determined by the encoder. For example, as discussed with respect to FIG. 1, a latent feature from each of the plurality of patches may be extracted to determine the latent feature matrix (z) 130, where $z \in R(h \times w \times nz)$ and $z=E(x)$.

For example, at 505, codes corresponding to the plurality of video patches of the input video may be selected by the encoder from a codebook including the codes. For example, as discussed with respect to FIG. 1, after the latent feature matrix (z) 130 is determined by the encoder (E) 120, a code for each video patch is selected (or assigned) from the codebook (Q) 140 using a look-up function q(.) by the encoder (E) 120.

At 506, an assigned code matrix including the codes corresponding to the plurality of video patches of the input video may be generated by the encoder. For example, as discussed with respect to FIG. 1, by comparing the similarity measures (e.g., euclidean distance, mahalanobis distance, etc.) between the latent feature representation of an input video patch in the latent feature matrix (z) 130 and each code in the codebook (Q) 140, the look-up function q(.) selects the nearest code as an assignment for each latent feature in the latent feature matrix (z) 130 to generate the assigned code matrix (q) 150.

At 507, the assigned code matrix from the encoder may be received by the decoder, and at 508, the decoder generates a reconstructed video based on the assigned code matrix. For example, as discussed with respect to FIG. 1, he assigned code matrix (q) 150 is passed to the decoder (G) 160 to generate a reconstructed video or a reconstructed input video ($\hat{x}$) from the elements of the assigned code matrix (q) 150.

A test input video may be received at the encoder and divided into a plurality of video patches. For example, as discussed with respect to FIG. 3, an input video x at test received at the encoder may be divided into a plurality of video patches.

Latent features from the plurality of video patches of the test input video may be extracted by the encoder and each of the plurality of video patches may be encoded into a latent feature vector based on the extracted latent features. For example, as discussed with respect to FIG. 3, after the input video x at test is divided into a plurality of video patches, an video patch of the plurality of video patches may be encoded into the latent feature vector $\hat{z}$ (shorthand for $z_{i,j}$) by the encoder (E) 120.

Next, a code may be assigned to each of the plurality of video patches to determine assigned codes of the plurality of video patches. For example, as discussed with respect to FIG. 3, the $k^{th}$ code from the codebook (Q) 320 that is of the shortest distance to the latent feature vector $\hat{z}$ among all the codes in the codebook (Q) 320 (based on the similarity measure between the latent feature vector $\hat{z}$ representation of the input video patch and the $k^{th}$ code from the codebook (Q) 320) is assigned to the video patch (e.g., 310(1), 310(2), 310(3) . . . , 310(n)) by the encoder (E) 120.

A patch-set including the assigned codes may be determined by the encoder. For example, as discussed with respect to FIG. 3, with all video patches, the latent feature vector $\hat{z}$ are extracted and a patch-set 330 of the corresponding codes is determined by the encoder (E) 120, where the patch-set 330 may include the assigned codes corresponding to each of the plurality of video patches (e.g., 310(1), 310(2), 310(3) . . . , 310(n)).

An anomaly score of each of the assigned codes of the patch-set may be determined by the encoder. For example, as discussed with respect to FIG. 3, for each entry in the patch-set 330, an anomaly score $s_{i,j} \in R$ may be calculated using either the probability density function $s_{i,j}=P(\hat{z})$, or weighted distance to the k nearest-neighbors in the patch-set 330.

The anomaly score of each of the assigned codes of the patch-set may be compared with a threshold by the encoder, and, a defect in one or more of the plurality of video patches may be determined by the encoder based on a result of the comparison. For example, as discussed with respect to FIG. 3, during the defect detection, an input sample is determined to be defective if any of the anomaly scores $s_{i,j}$ is larger than a given threshold at index k.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Embodiments described herein are examples only. One skilled in the art may recognize various alternative embodiments from those specifically disclosed. Those alternative embodiments are also intended to be within the scope of this disclosure. As such, the embodiments are limited only by the following claims and their equivalents

What is claimed is:
1. A system comprising:
a memory,
an encoder; and
a decoder,
wherein the system is operable to:
  receive, at the encoder, an input video;
  divide, by the encoder, the input video into a plurality of video patches;
  select, by the encoder, codes corresponding to the plurality of video patches of the input video, from a codebook comprising the codes;
  determine, by the encoder, an assigned code matrix comprising the codes corresponding to the plurality of video patches of the input video;
  receive, by the decoder, the assigned code matrix from the encoder; and
  generate, by the decoder, a reconstructed video based on the assigned code matrix.
2. The system of claim 1, wherein the codes corresponding to the plurality of video patches of the input video are selected from the codebook using a look-up function, wherein the look-up function, the codebook, and the assigned code matrix are stored in the memory.
3. The system of claim 2, wherein the system is further operable to:
  extract, by the encoder, latent features from the plurality of video patches of the input video; and
  determine, by the encoder, a latent features matrix comprising the latent features extracted from the plurality of video patches of the input video.
4. The system of claim 3, wherein the look-up function is operable to select a nearest code as an assignment for each of the latent features in the latent feature matrix to determine the assigned code matrix.
5. The system of claim 3, wherein the encoder is operable to select a code corresponding to a video patch of the plurality of video patches of the input video from the codebook by comparing similarity measures between a latent feature representation of the video patch in the latent feature matrix and a corresponding code in the codebook.
6. The system of claim 5, wherein the similarity measures comprise a Euclidean distance or a mahalanobis distance between the latent feature representation of the video patch in the latent feature matrix and the corresponding code in the codebook.
7. The system of claim 1, wherein the assigned code matrix is determined based on selecting the codes corresponding to the plurality of video patches of the input video from the codebook based on a look-up function.
8. The system of claim 7, wherein a code from among the codes in the assigned code matrix is assigned to a video patch of the plurality of video patches of the input video based on a vector quantization of a latent feature corresponding to the video patch.
9. The system of claim 8, wherein a vector quantization loss of the system comprises a reconstruction loss that occurs during generation of the reconstructed video and a loss that occurs during the vector quantization of latent features corresponding to the plurality of video patches of the input video.
10. The system of claim 9, further comprising:
  a patch-wise discriminator network operable to operate as a generative adversarial network to determine an adversarial training loss between the input video and the reconstructed video.
11. The system of claim 10, wherein a total loss of the system in generating the reconstructed video from the input video comprises the vector quantization loss and the adversarial training loss.
12. The system of claim 1, further operable to:
  receive, by the encoder, a test input video;
  divide, by the encoder, the test input video into a plurality of video patches;
  extract, by the encoder, latent features from the plurality of video patches of the test input video;
  encode, by the encoder, each of the plurality of video patches into a latent feature vector based on the extracted latent features;
  assign, by the encoder, a code to each of the plurality of video patches to determine assigned codes of the plurality of video patches;
  determine, by the encoder, a patch-set comprising the assigned codes;
  determine, by the encoder, an anomaly score of each of the assigned codes of the patch-set;
  compare, by the encoder, the anomaly score of each of the assigned codes of the patch-set with a threshold; and
  determine, by the encoder, a defect in one or more of the plurality of video patches based on a result of a comparison.
13. The system of claim 12, wherein a code from the codebook that is of a shortest distance to the latent feature vector of a video patch of the plurality of video patches among the codes in the codebook is assigned to the video patch.
14. The system of claim 12, wherein the anomaly score of each of the assigned codes of the patch-set is determined based on a probability density function.
15. A method comprising:
  receiving, at an encoder, an input video;
  dividing, at the encoder, the input video into a plurality of video patches;
  selecting, by the encoder, codes corresponding to the plurality of video patches of the input video, from a codebook comprising the codes;

determining, by the encoder, an assigned code matrix comprising the codes corresponding to the plurality of video patches of the input video;

receiving, by a decoder, the assigned code matrix from the encoder; and generating, by the decoder, a reconstructed video based on the assigned code matrix.

16. The method of claim 15, wherein the codes corresponding to the plurality of video patches of the input video are selected from the codebook using a look-up function, wherein the method further comprises:

extracting, by the encoder, latent features from the plurality of video patches of the input video; and determining, by the encoder, a latent features matrix comprising the latent features extracted from the plurality of video patches of the input video.

17. The method of claim 16, wherein the look-up function is operable to select a nearest code as an assignment for each of the latent features in the latent feature matrix to determine the assigned code matrix, and wherein the encoder is operable to select a code corresponding to a video patch of the plurality of video patches of the input video from the codebook by comparing similarity measures between a latent feature representation of the video patch in the latent feature matrix and a corresponding code in the codebook.

18. The method of claim 17, wherein a code from among the codes in the assigned code matrix is assigned to a video patch of the plurality of video patches of the input video based on a vector quantization of a latent feature corresponding to the video patch, wherein a vector quantization loss comprises a reconstruction loss that occurs during generation of the reconstructed video and a loss that occurs during the vector quantization of latent features corresponding to the plurality of video patches of the input video, and wherein a total loss for generating the reconstructed video from the input video comprises the vector quantization loss and an adversarial training loss.

19. The method of claim 15, further comprising:

extracting, by the encoder, latent features from the plurality of video patches of the input video;

encoding, by the encoder, each of the plurality of video patches into a latent feature vector based on the extracted latent features;

assigning, by the encoder, a code to each of the plurality of video patches to determine assigned codes of the plurality of video patches;

determining, by the encoder, a patch-set comprising the assigned codes;

determining, by the encoder, an anomaly score of each of the assigned codes of the patch-set;

compare, by the encoder, the anomaly score of each of the assigned codes of the patch-set with a threshold; and determine, by the encoder, a defect in one or more of the plurality of video patches based on a result of a comparison.

20. A non-transitory computer readable storage medium operable to store instructions that, when executed by a processor included in a computing device, cause the computing device to:

receive, at an encoder of the computer device, an input video;

divide, at the encoder, the input video into a plurality of video patches;

select, by the encoder, codes corresponding to the plurality of video patches of the input video, from a codebook comprising the codes;

determine, by the encoder, an assigned code matrix comprising the codes corresponding to the plurality of video patches of the input video;

receive, by a decoder of the computer device, the assigned code matrix from the encoder; and generate, by the decoder, a reconstructed video based on the assigned code matrix.

* * * * *

UNITED STATES PATENT AND TRADEMARK OFFICE
CERTIFICATE OF CORRECTION

| | | |
|---|---|---|
| PATENT NO. | : 12,301,833 B2 | Page 1 of 1 |
| APPLICATION NO. | : 18/074195 | |
| DATED | : May 13, 2025 | |
| INVENTOR(S) | : Qu et al. | |

It is certified that error appears in the above-identified patent and that said Letters Patent is hereby corrected as shown below:

On the Title Page

In item (73), in Column 1, in "Assignee", Line 1, delete "Samsung Electronics Co., Ltd." and insert --Samsung Display Co., Ltd.--

Signed and Sealed this
Ninth Day of December, 2025

John A. Squires
*Director of the United States Patent and Trademark Office*